US008743526B2

(12) United States Patent
Mayorkis

(10) Patent No.: US 8,743,526 B2
(45) Date of Patent: Jun. 3, 2014

(54) ELECTROSTATIC ROLLER APPARATUS AND A SYSTEM FOR ELECTROSTATICALLY SUPPORTING AN OBJECT

(76) Inventor: Victor Mayorkis, Foster City, CA (US)

(*) Notice: Subject to any disclaimer, the term of this patent is extended or adjusted under 35 U.S.C. 154(b) by 0 days.

(21) Appl. No.: 13/410,325

(22) Filed: Mar. 2, 2012

(65) Prior Publication Data

US 2012/0224292 A1 Sep. 6, 2012

Related U.S. Application Data

(60) Provisional application No. 61/449,104, filed on Mar. 4, 2011.

(51) Int. Cl.
*G03G 15/02* (2006.01)
*H05F 3/00* (2006.01)

(52) U.S. Cl.
USPC ........................................................ 361/225

(58) Field of Classification Search
USPC ................. 361/212–235; 310/225; 156/273.1
See application file for complete search history.

(56) References Cited

U.S. PATENT DOCUMENTS

| 3,359,469 | A | * | 12/1967 | Levy et al. ..................... 361/234 |
| 3,440,750 | A | | 4/1969 | Toyh et al. |
| 3,582,730 | A | * | 6/1971 | Testone ......................... 361/234 |
| 3,944,355 | A | * | 3/1976 | Matkan ......................... 399/162 |
| 4,225,369 | A | | 9/1980 | Felchlin |
| 4,275,112 | A | | 6/1981 | Savage, Jr. |
| 4,372,798 | A | * | 2/1983 | Dalton ....................... 156/273.1 |
| 4,741,119 | A | | 5/1988 | Baryla |
| 4,992,121 | A | | 2/1991 | Rubino |
| 5,351,109 | A | * | 9/1994 | Haneda ......................... 399/175 |
| 5,590,014 | A | * | 12/1996 | Bushman ....................... 361/225 |
| 5,638,249 | A | | 6/1997 | Rubino et al. |
| 6,445,562 | B1 | * | 9/2002 | Hahne et al. ................... 361/225 |
| 7,815,484 | B2 | | 10/2010 | Kriman et al. |

* cited by examiner

*Primary Examiner* — Rexford Barnie
*Assistant Examiner* — Christopher Clark

(57) ABSTRACT

There is provided an electrostatic roller apparatus comprising a body including: a first body portion and a second body portion; the first body portion including an electrostatic generating sub-assembly; a roller applicator and a support structure, the support structure having a first end and a second end, the first end being configured to rotatably mount the roller applicator thereupon and the second end being configured to be coupled with the second body portion.

14 Claims, 6 Drawing Sheets

ELECTROSTATIC ROLLER APPARATUS AND A SYSTEM FOR ELECTROSTATICALLY SUPPORTING AN OBJECT

FIELD OF THE INVENTION

The present invention generally relates to, but is not limited to, an electrostatic roller apparatus and more specifically the present invention relates to, but is not limited to, an electrostatic roller apparatus and a system for electrostatically supporting an object.

BACKGROUND OF THE INVENTION

It is known in the art to apply various items on a substantially-vertical support structure. For example, it is known to mount pictures, posters and the like onto a wall. This is done for both personal and commercial use. Numerous means to attach such items onto the substantially-vertical support structures have been proposed in the art. Generally speaking, numerous mechanical means have been proposed—nails, bolts, glue, Scotch® tape and the like. It is also known to apply items to the free-standing support structures by employing electrostatic force. For example, it is known to use static cling vinyl decorations, commonly sold as novelties, which vinyl decorations can support themselves electrostatically on a window or the like.

U.S. Pat. No. 5,638,249 Rubino, et al. On Jun. 10, 1997 teaches an electrostatic support system for applying posters and the like in a removable fashion on wall surfaces using a thin film or foam layer of dielectric backing and a hand-held high voltage charger suitable for creating corona charged particles. The system and method provide a practical, simple and inexpensive manner of mounting displays which may be easily removed and repositioned without damage to the wall surface.

U.S. Pat. No. 3,440,750 issued to Toyh et al. on Apr. 29, 1969 teaches an amusement and display apparatus in which three-dimensional characters of plastic foam are removably secured onto a rigid board by static electricity.

U.S. Pat. No. 4,225,369 issued to Felchlin on Sep. 30, 1980 teaches a method of securing a sheet or a poster to a base, wherein the sheet or poster is brought into contact with at least one plastics material sheet and caused to adhere to said base by dampening said base or by wiping said base on the poster side with a means suitable for producing an electrostatic charge. In one particular application two plastics material sheets joined together along one edge and folded along said edge so as to be superposed one on the other are utilized, said sheet or poster being placed between or on said superposed sheets, said superposed sheets being caused to adhere to one another by being wiped with means suitable for producing an electrostatic charge.

U.S. Pat. No. 4,275,112 issued to Savage, Jr. on Jun. 23, 1981 teaches decorative hanging, electrostatically adherent to wall and ceiling surfaces comprises a doubly charged, irradiated and crosslinked insulative plastic foam.

U.S. Pat. No. 4,741,119 issued to Baryla on May 3, 1988 teaches a display board for displaying, behind a transparent window, a sheet document such as a paper document clinging electrostatically on the surface of a dielectric plastic backing board. The sheet document is covered by a sheet of transparent thin film plastic, preferably provided with a display window with a contrasting border or matte, which also tends to cling electrostatically against the sheet document with the result that the sheet document is sandwiched between the backing board and the sheet of transparent plastic film.

U.S. Pat. No. 4,992,121 issued to Rubino on Feb. 12, 1991 teaches a method of adhering a relatively heavy sheet or three-dimensional object to a support surface using an electrostatically chargeable intermediate sheet, including providing a sheet which is capable of carrying a charge sufficient to support at least three ounces per square foot of intermediate sheet surface for at least one month and charging the sheet using a contaminant free buffer material selected from the group consisting of wool, natural fiber, artificial fiber and chamois. A decorative hanging including such an intermediate sheet is also disclosed.

U.S. Pat. No. 7,815,484 issued to Kriman, et al. on Oct. 19, 2010 teaches an electrostatic toy has a levitating object; and an electrostatic wand which causes levitation of the object and is provided with an electrostatic generator that charges the wand and is operatable by one hand of a user.

SUMMARY OF THE INVENTION

According to a first broad aspect of the present invention, there is provided an electrostatic roller apparatus comprising a body including: a first body portion and a second body portion; the first body portion including an electrostatic generating sub-assembly; a roller applicator and a support structure, the support structure having a first end and a second end, the first end being configured to rotatably mount the roller applicator thereupon and the second end being configured to be coupled with the second body portion, the support structure being configured to transmit, in use, charge generated by the electrostatic generating sub-assembly onto the roller applicator.

According to a second broad aspect of the present invention, there is provided a retrofit kit comprising: a roller applicator and a support structure, the support structure having a first end and a second end, the first end being configured to rotatably mount the roller applicator thereupon and the second end being configured to be coupled with a electrostatic charge separating member, the support structure being configured to transmit, in use, charge generated by the electrostatic generating sub-assembly onto the roller applicator.

These and other aspects and features of non-limiting embodiments of the present invention will now become apparent to those skilled in the art upon review of the following description of specific non-limiting embodiments of the invention in conjunction with the accompanying drawings.

DESCRIPTION OF THE DRAWINGS

A better understanding of the embodiments of the present invention (including alternatives and/or variations thereof) may be obtained with reference to the detailed description of the embodiments along with the following drawings, in which.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION OF EMBODIMENTS

Figure 1:
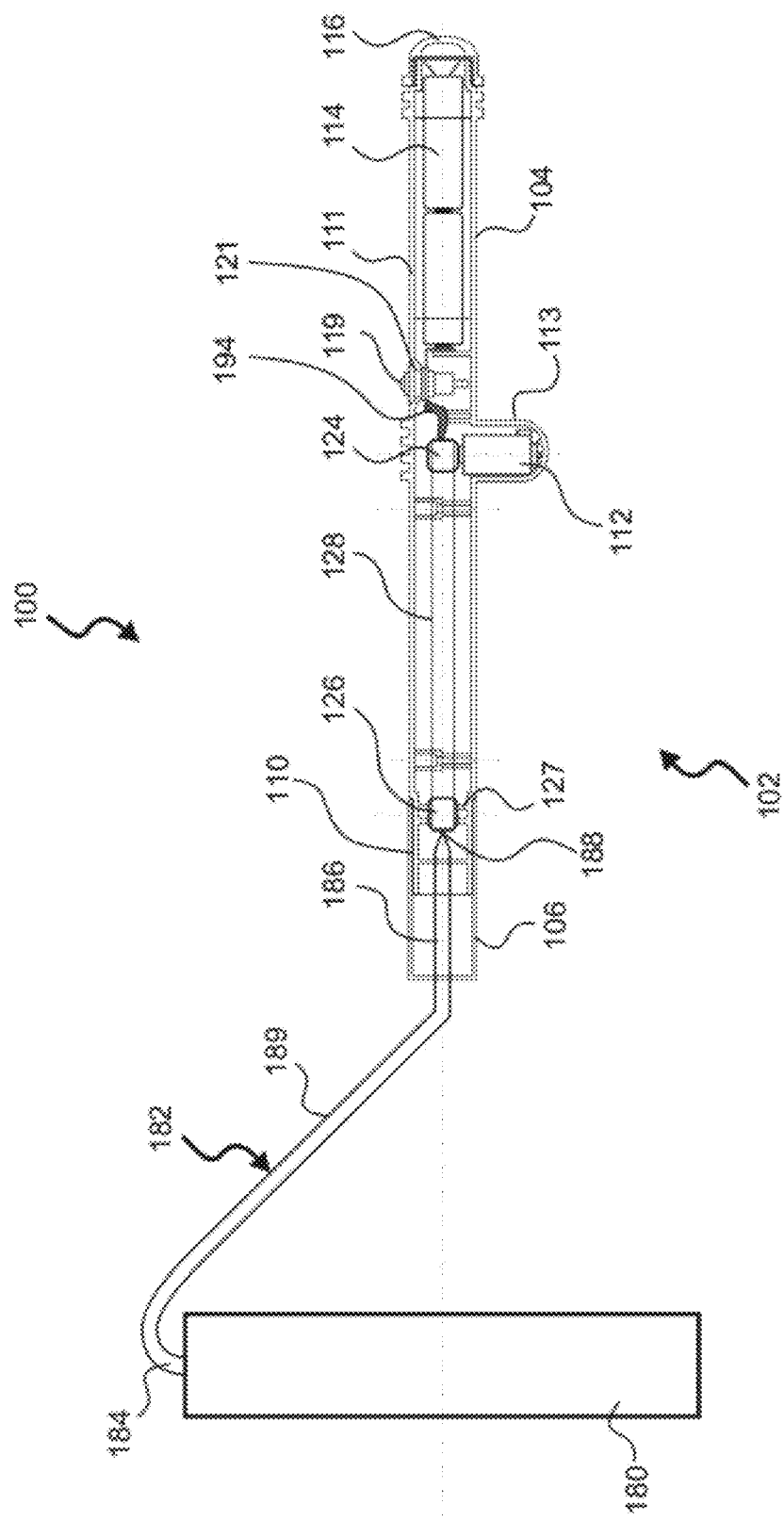
FIG. 1 depicts a front sectional view of an electrostatic roller apparatus in an assembled state, the electrostatic roller apparatus being implemented in accordance with a non-limiting embodiment of the present invention.
Figure 2:
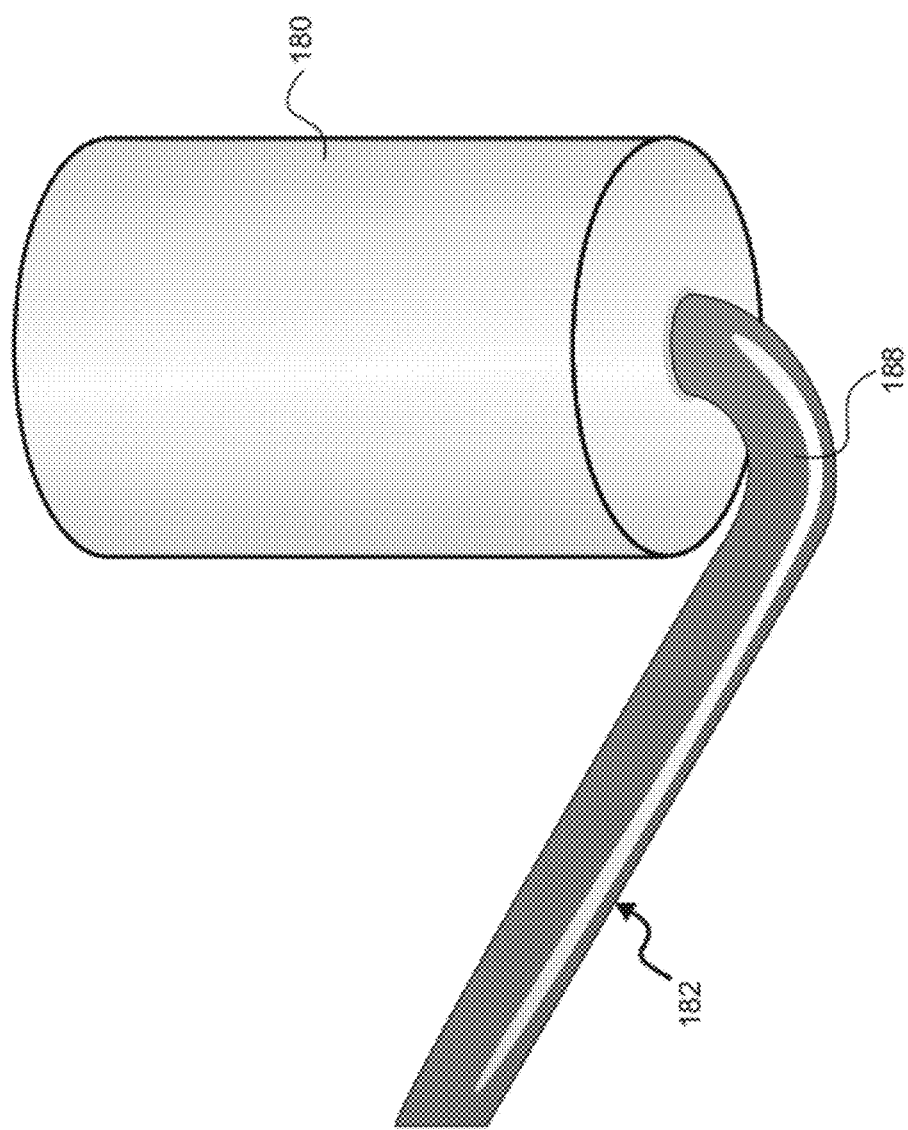
FIG. 2 is a perspective view of a portion of the electrostatic roller apparatus of FIG. 1, with the roller being depicted in greater detail.

According to embodiments of the present invention, there is provided an electrostatic roller apparatus, depicted generally in FIG. 1 at 100. FIG. 1 depicts a perspective view of the electrostatic roller apparatus 100 in an assembled state. Reference shall also be made to FIG. 2, which depicts a perspective view of a portion of the electrostatic roller apparatus 100.

In the illustrated embodiment, the electrostatic roller apparatus 100 comprises a body 102, which in turn is made up of two parts or "portions"—a first body portion 104 and a second body portion 106. However, in alternative embodiments not depicted in FIG. 1 and FIG. 2, the body 102 can be implemented as a unitary structure or, alternatively, can have more than two portions assembled into the assembled state similar to what is depicted in FIG. 1. In other words, the first body portion 104 and the second body portion 106 can be either (i) made of separate components and be detachably coupled therebetween (which can be two or more components) or (ii) be made of a unitary component.

The first body portion 104 has a connecting end 110, which is of a diameter smaller than the rest of the first body portion 104 and that of the second body portion 106. The connecting end 110 is receivable within the second body portion 106 (which is substantially hollow inside) in an interference fit arrangement for releasable retention therein, as depicted in FIG. 1. Other couplings are, of course possible, such as a screw in connection, snap on connection and the like.

The first body portion 104 comprises a housing 111. The housing 111 can be made of plastic or any other suitable material. Generally speaking, the first body portion 104 may be implemented to house any kind of electrostatic generator. In a specific embodiment to be depicted herein below, the first body portion 104 can be configured to house a Van de Graaff generator. However, in alternative embodiments of the preset invention, the first body portion 104 can be configured to house a piezo-electric generator, and other types of generators similar to those used, for example, in air ionizers, purifiers, electrostatic loudspeakers, electrostatic spraying and flocking devices.

The housing 111 contains a motive member 112 and a source of power 114 for powering the motive member 112. In the illustrated embodiment, the motive member 112 is housed in a body appendix 113. The body appendix 113 is oriented in a "T-arrangement" vis-à-vis the orientation of the housing 111 As such, in alternative embodiments of the present invention, the motive member 112 can be placed in a different configuration, such as in-line with the source of power 114, for example.

In the illustrated embodiment, the motive member 112 is implemented as an electric motor and the source of power 114 is implemented as at least one battery and, more specifically, a set of two AA batteries. The type of the electric motor used is not limited and, as such, the motor can be implemented as an AC motor, a DC motor, brushless motor, servo motor or the like. Similarly, in alternative embodiments, the source of power 114 can comprise a different type of batteries or may be implemented as a cord that can be plugged into a power outlet, for example.

In the illustrated embodiment, there is also provided a cover 116, which can be releasably attached to the housing 111 for selectively opening the interior of the housing 111 (to insert or replace the source of power 114, for example) and closing the interior of the housing 111 (to maintain the source of power 114 in an operational configuration). In the illustrated configuration, the cover 116 is attached to the rest of the first body portion 104 through a screw-tip connection. It should be noted that in alternative embodiments, the source of power 114 (i.e. the batteries at the like) can be inserted from a side of the first body portion 104 or in any other suitable manner. Alternatively, the source of power 114 can be housed in a detachable plate (not depicted) made to fit a portion of the first body portion 104 and to be attached to the first body portion 104 with screws or in a snap on connection.

Also provided, within the housing 111 are a switch button 119 housed within a gasket 121. Generally speaking, the function of the switch button 119 is to switch the electrostatic roller apparatus 100 on (when the switch button 119 is depressed) or off (when the switch button 119 is released). It is noted that the gasket 121 can be used for grounding, through a body of a user, as will be described in greater detail herein below. In alternative embodiments of the present invention, a number of alternative ways to ground the electrostatic roller apparatus 100 can be used.

Provided in accordance with non-limiting embodiments of the present invention and operatively coupled to the motive member 112 is a first roller 124 (for example, by means of the first roller 124 being mounted on a first support axle (not visible) coupled to the motive member 112 or by any other suitable means). There is also provided a second roller 126 within the housing 111 at a location remote from the first roller 124, which is in this example, more proximate to the second body portion 106. The second roller is mounted on a second support axle 127, which allows for rotational movement thereof.

Provided between the first roller 124 and the second roller 126 is a belt 128. When in use (i.e. when the switch button 119 is depressed), with the motive member 112 providing motive power, the first roller 124 rotates and drives the belt 128.

Therefore, within embodiments of the present invention, the first roller 124, the second roller 126 and the belt 128 can be considered to be an "electrostatic charge separating member", which is configured to separate/generate the electrostatic charge and pass it further onto a charge collector. As such, in some embodiments, the electrostatic charge separating member can be implemented as a Van de Graaf generator. As will be described in greater detail herein below, it can be said that the electrostatic charge separating member together with the motive member 112 and the source of power 114 form an electrostatic generating sub-assembly.

As is known in accordance with a typical implementation of the Van de Graaff generator, proximate each the first roller 124 and the second roller 126, there can be provided a respective metal conductive brush. In the specific embodiment depicted herein, there is provided a brush 194 proximate the first roller 124.

The brush 194 can be electrically coupled to the gasket 121, in the specific embodiment for grounding through the body of the user or to any other suitable means for grounding, which are by no means limited and will become apparent to those of skill in the art. As such, the brush 194 is electrically coupled to grounding means to ground the accumulated charge through a body of a user, when in use. The implementation of the other brush will be described in greater detail herein below.

Within embodiments of the present invention, there is provided a roller applicator 180 rotatably mounted onto a support structure 182. The support structure has a first end 184 and a second end 186. The first end 184 is used for mounting the roller applicator 180 thereupon. The second end 186 is used to mount the support structure 182 into the second body portion 106 through an opening provided therein (not depicted).

Figure 4:
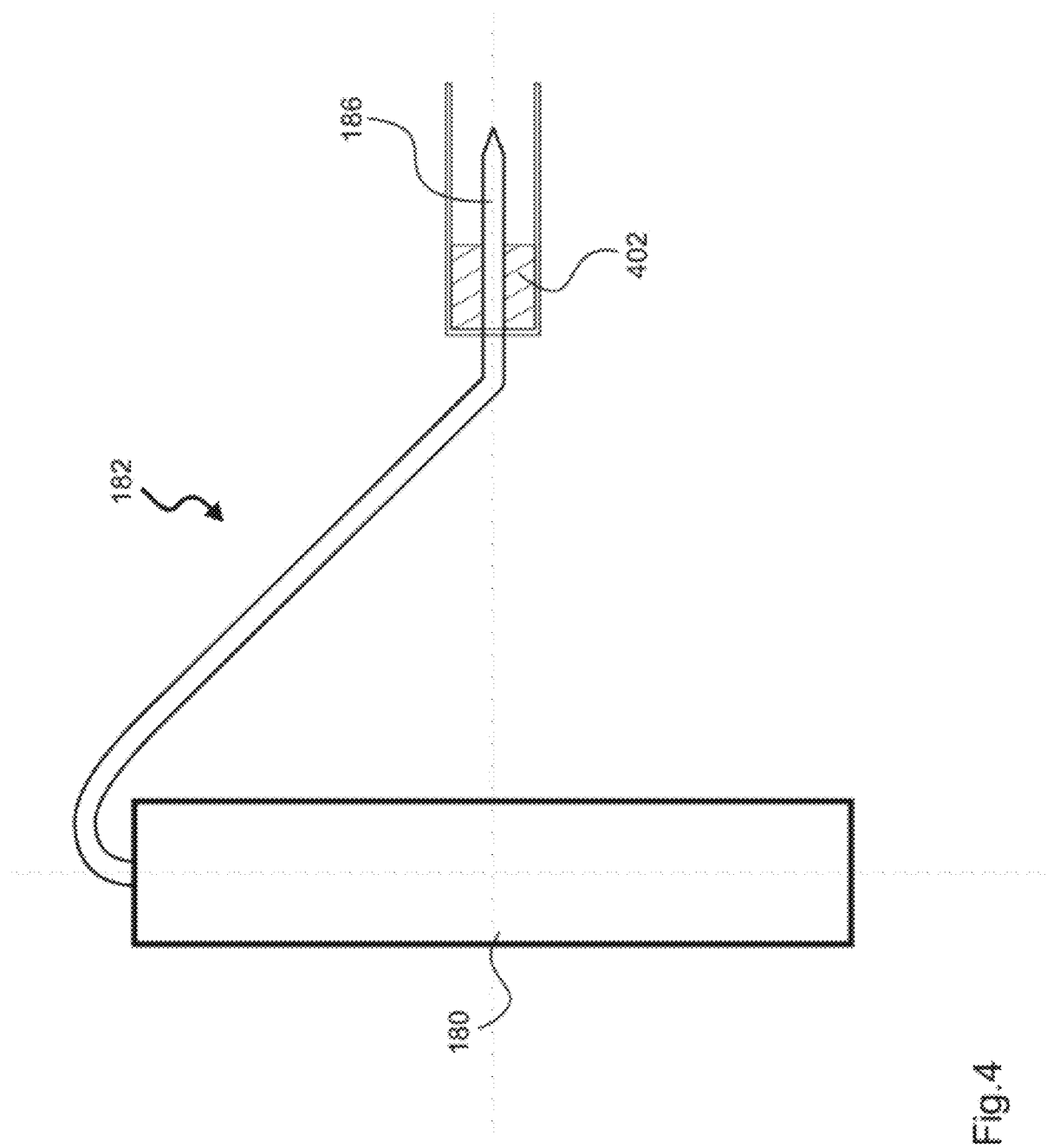
FIG. 4 depicts a front sectional view of the roller applicator and the support structure implemented in accordance with another non-limiting embodiment of the present invention.

With brief reference to FIG. 4, which depicts a front sectional view of the roller applicator 180 and the support structure 182. According to these non-limiting embodiments, there is provided a mount 402 for mounting, positioning and maintaining the roller applicator 180 inside the second body portion 106. Within these embodiments, the mount 402 can be made of metal or plastic.

Returning to the description of FIG. 1, in the specific embodiment of the present invention, the second end 186 is implemented as having a conical shape terminating into an apex 188. In use, the apex 188 is located in close proximity of the belt 128. In a sense the apex 188 and the second end 186 act as the charge collector for collecting electric charge from the belt 128. Within these embodiments, the apex 188, in effect, acts as the second brush for collecting residual charge from the belt 128.

Figure 5:
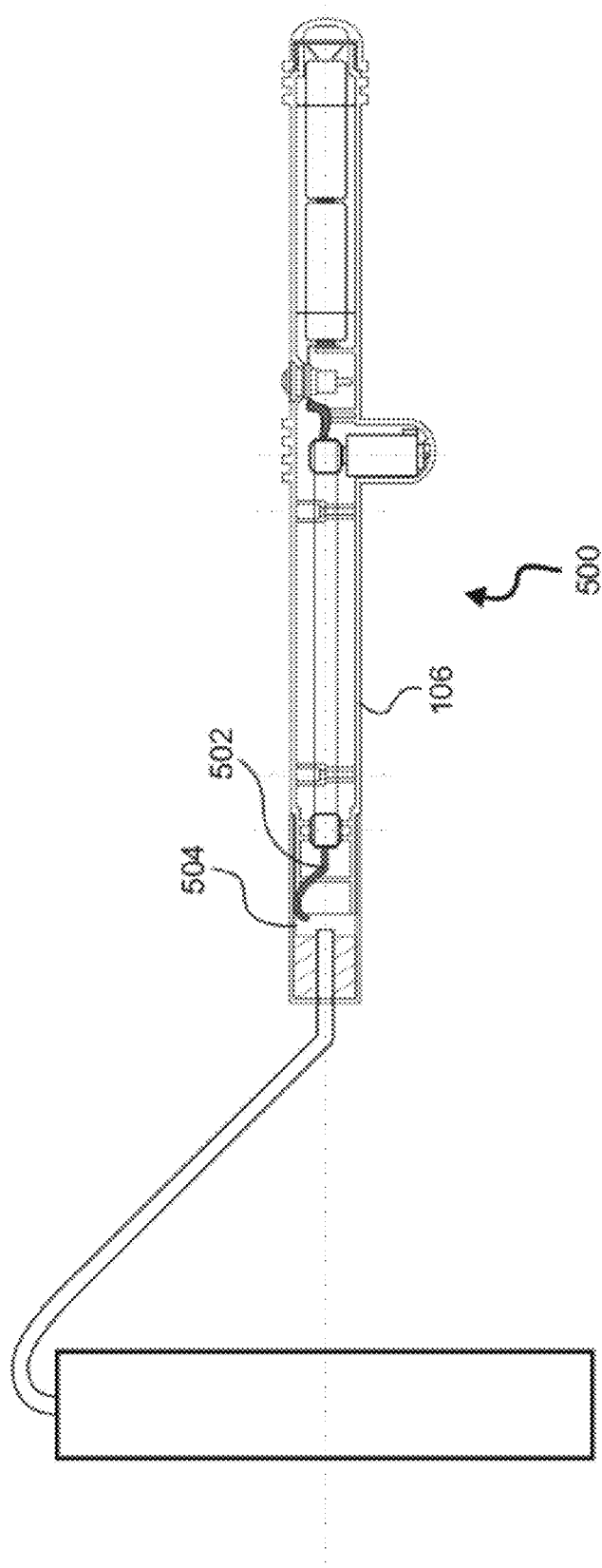
FIG. 5 depicts a front sectional view of an electrostatic roller apparatus having the roller applicator and the support structure implemented in accordance with yet another non-limiting embodiment of the present invention

However, in alternative embodiments of the present invention, a separate second brush (not present in FIG. 1 embodiment per se) can be provided in close proximity to the second roller 126 for collecting the residual charge therefrom. In those alternative embodiments, when in use, the second end 186 can be electrically coupled to such second brush. This is depicted with reference to FIG. 5, which depicts a front sectional view of an electrostatic roller apparatus 500 implemented in accordance with another non-limiting embodiment of the present invention.

Generally speaking, the electrostatic roller apparatus 500 can be implemented in substantially the same manner as the electrostatic roller apparatus 100 of FIG. 1, other then for the specific differences to be described herein below. Within these non-limiting embodiments of the present invention, there is provided a second brush 502. There is also provided a mount 504 for mounting, positioning and maintaining the roller applicator 180 inside the second body portion 106. Within these embodiments, the mount 402 can be made of metal or any other conductive material. A protruding arm (not separately numbered) of the mount 504, in use, is in electric coupling with the second brush 502.

Returning to the description of FIG. 1, in embodiments of the present invention, the support structure 182 is made of electrically conductive material. In specific examples, the support structure 182 can be made of a material selected from copper, iron, steel or any other suitable conductive material.

The support structure 182 and specifically the first end 184 are electrically coupled to the roller applicator 180 The part of the first end 184 of the support structure 182 located underneath the roller applicator 180 does not have insulating casing or insulating coating over it, thus the conductive surface of the support structure 182 comes into direct contact with the material used to make the roller applicator 180, thus creating voltage on the roller applicator 180 sufficient to charge film or paper on contact, when in use as will be described below.

In this case the roller applicator 180 is charged from inside out and along the entire length of the first end 184 of the support structure 182 onto which it is mounted. Within these embodiments, the roller applicator 180 is charged substantially throughout its cross-section. As a specific technical effect of these embodiments, the length if the roller applicator 180 is not specifically restricted and is selected to correspond to the length of the first end 184 onto which it is mounted. As such, these embodiments of the roller applicator 180 are specifically applicable but not limited to larger scale applications, such as large posters or advertisement boards.

As such, the support structure 182 is configured to transmit electrical charge collected from the electrostatic charge separating member and pass it onto the roller applicator 180.

In some embodiments, the outer surface of the roller applicator 180 is made of dielectric material. For example, the outer surface of the roller applicator 180 can be made of soft material, such as but by no means limited to as synthetic foam, microfiber, polyester, wool, cotton or the like. In other embodiments of the present invention, the outer surface of the roller applicator 180 can be made of insulating plastic. Generally speaking, the roller applicator 180 can be made of cardboard, wood, silicon, conductive plastic, certain types of synthetic foam, cotton, polyethylene, polyester, polypropylene, Teflon®, microfiber, wool and the like. In certain non-limiting embodiments of the present invention, the roller applicator 180 can be of a multi-layer structure. For example, an inner layer can be made of a first material (such as plastic) and an outer layer can be made of a second material (such as a soft material, which can be microfiber or polyester fuzz, or synthetic foam.

There also provided an insulation sleeve 189, which can include a flexible sleeve or a hard casing) provided over the support structure 182. The insulation sleeve is configured to prevent accidental discharge of the electrostatic energy if touched by a user (not depicted).

Having described construction of the electrostatic roller apparatus 100, general operation thereof will now be described in greater detail. When in use (i.e. when the switch button 119 is depressed), with the motive member 112 providing motive power, the first roller 124 is rotated, which in turns drives the belt 128. Recalling that the first roller 124, the second roller 126 and the belt 128 are implemented as an "electrostatic charge separating member", which is configured to separate/generate the electrostatic charge, the electrostatic charge is generated and accumulated onto the support structure 182 via the apex 188.

Recalling that the roller applicator 180, which roller applicator 180 rotates around the first end 184 of the support structure 182 and that the roller applicator 180 is electrically operatively coupled to the first end 184, the support structure 182 transmits the electrostatic charge from the electrostatic charge separating member onto the roller applicator 180.

Within embodiments of the present invention, when in use, roller applicator 180 is used to effectively distribute electrostatic charge onto a material to be removably adhered onto a support surface.

Figure 3:
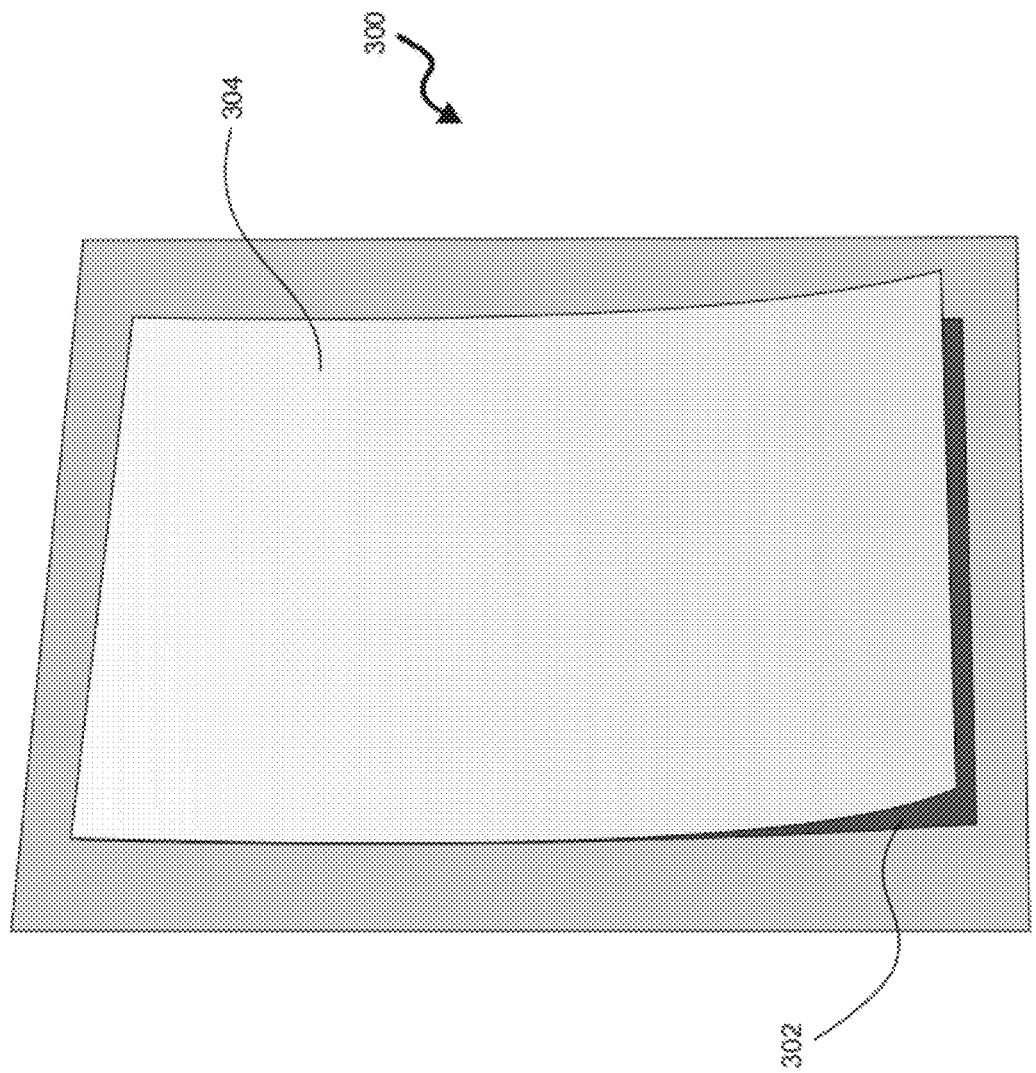
FIG. 3 depicts a perspective view of a non-limiting embodiment of an application for which the electrostatic roller apparatus of FIG. 1 can be used.

Just for an illustration purpose and not to limit the scope, the material to be adhered can be include plastic film, thin insulating foam, or "sandwiches" of materials made of alternating layers of film, or foam, or paper. In a particular embodiment, the electrostatic roller apparatus 100 can be used to adhere a piece of paper onto a wall by use of an intermediate plastic film. In sense, a conducting wall, an insulating plastic and conducting paper create a sandwich similar to a capacitor which allows it to maintain charge for a substantially long time. An example of such a sandwich is depicted with reference to FIG. 3, which depicts a perspective view of an application. In this embodiment, a vertical support in the form of a wall 300 is used. Mounted onto it, using the electrostatic roller apparatus 100, is a film 302. Mounted then, onto the film 302, again using the electrostatic roller apparatus 100, is an article 304. The article 304 can be a piece of paper, a poster and the like.

When the electrostatic roller apparatus 100 is used over the material to be adhered, the charge generated by the electrostatic charge separating member and transferred onto the roller applicator 180 eventually gets transferred onto the material by means of rotating the roller applicator 180 over the material. A specific technical advantage attributable to the use of the roller applicator 180 may include ability to smoothen the material, while charging it, preventing formation of air bubbles. This, in turn, may lead to a comparatively better or long-lasting adhesion between the material and the support surface.

It should be noted that in some embodiments of the present invention, the electrostatic roller apparatus 100 can be sold as a whole. In other embodiments, a retrofit kit can be sold. A retrofit kit may include the roller applicator 180 and the support structure 182, both described above, that can be mounted by a user onto a suitable accumulator, which is obtained separately by the user, such as an off-the-shelf product and the like. The retrofit kit can take the form, as depicted in FIG. 4, for example.

Figure 6:
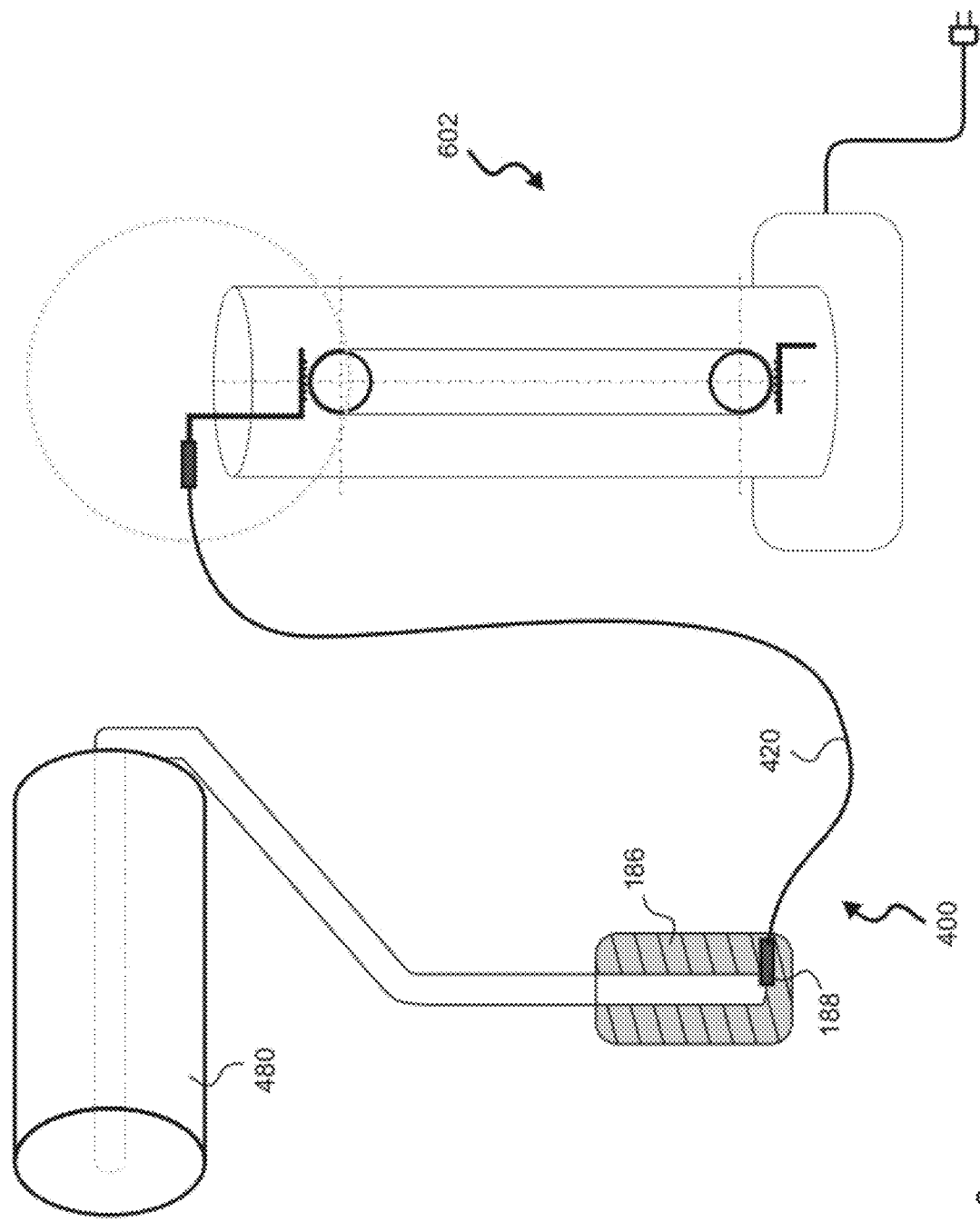
FIG. 6 depicts a schematic representation of yet another example of an electrostatic apparatus implemented non-limiting embodiment of the present invention.

In alternative embodiments, the apex 188 or the second end 186 may be also electrically coupled with the free standing electrostatic generator via a conductive electric cord, as is schematically depicted in FIG. 6, which depicts another embodiment of an electrostatic roller apparatus 400. Within these embodiments, an electrostatic separating member is implemented as a free-standing Van de Graaf generator 602 coupled to a roller applicator 480 via a cord 420. It is noted that the Van de Graaf applicator in this case is implemented and grounded in accordance with known techniques.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. An electrostatic roller apparatus comprising:
 a body including:
  a first body portion and a second body portion;
  the first body portion including an electrostatic generating sub-assembly;
  a roller applicator and a support structure, the support structure having a first end and a second end, the first end being configured to rotatably mount the roller applicator thereupon and the second end being configured to be coupled with the second body portion;
  the support structure being configured to transmit, in use, charge generated by the electrostatic generating sub-assembly onto the roller applicator.

2. The electrostatic roller apparatus of claim 1, wherein the second end comprises an apex terminating in close proximity to the electrostatic generating sub-assembly for collecting a charge generated therein and for transfer of the charge onto the roller applicator.

3. The electrostatic roller apparatus of claim 1, wherein said roller applicator is made of a material selected from: cardboard, wood, silicon, conductive plastic, certain types of synthetic foam, cotton, polyethylene, polyester, polypropylene, Teflon®, microfiber and wool.

4. The electrostatic roller apparatus of claim 1, wherein at least an outer surface of said roller applicator is made of soft material.

5. The electrostatic roller apparatus of claim 1, wherein said support structure is made of electrically conductive material.

6. The electrostatic roller apparatus of claim 4, further comprising an insulation sleeve provided over the support structure.

7. The electrostatic roller apparatus of claim 1, wherein said electrostatic generating sub-assembly comprises:
 an electrostatic charge separating member for generating an electrostatic charge;
 a motive member and a source of power for powering the motive member, the motive member and the source of power for providing motive power to the electrostatic charge separating member.

8. The electrostatic roller apparatus of claim 7, wherein said electrostatic charge separating member being implemented as a Van de Graaff generator.

9. The electrostatic roller apparatus of claim 7, wherein said electrostatic charge separating member comprises:
 a first roller, a second roller, and a belt therebetween, wherein the first roller is moved, in use, by the motive member;
 a brush located proximate to the first roller being electrically coupled to grounding means to ground an accumulated charge through a body of a user, when in use.

10. The electrostatic roller apparatus of claim 9, wherein the second end comprises an apex terminating in close proximity to the second roller for collecting residual charge therefrom.

11. The electrostatic roller apparatus of claim 9, wherein a second brush is located proximate to the second roller; and wherein
 the second end comprises an apex and wherein in use, the apex is electrically coupled to the second brush.

12. The electrostatic roller apparatus of claim 1, further comprising a mount for mounting the support structure into the second body portion.

13. The electrostatic roller apparatus of claim 12, wherein said mount is made from one of metal and plastic.

14. A retrofit kit comprising:
 a roller applicator and a support structure, the support structure having a first end and a second end, the first end being configured to rotatably mount the roller applicator thereupon and the second end being configured to be coupled with an electrostatic charge separating member, the support structure being configured to transmit, in use, charge generated by the electrostatic charge separating member onto the roller applicator.

* * * * *